May 24, 1960 S. W. H. PERRY 2,937,495

GAS TURBINE PLANT

Filed Feb. 25, 1957 2 Sheets-Sheet 1

Inventor
Sydney William Henry Perry
By
Stevens, Davis,
Attorneys

2,937,495

GAS TURBINE PLANT

Sydney William Henry Perry, Cove, Farnborough, England, assignor to Power Jets (Research and Development) Limited, London, England, a British company Filed Feb. 25, 1957, Ser. No. 642,183

Claims priority, application Great Britain Feb. 27, 1956

7 Claims. (Cl. 60—35.6)

This invention relates to gas turbine jet propulsion power plant of the ducted fan type, that is, of the type affording two separate flow paths in parallel, one through the compressor, combustion system and turbine and the other through a row of fan blades operating in a separate duct and driven from the turbine.

According to the invention, a gas turbine jet propulsion power plant of the ducted fan type comprises a compressor and a turbine assembly coaxial therewith and axially spaced therefrom, the turbine assembly including a first rotor in driving connection with the compressor rotor through a shaft extending through a combustion system lying between the compressor and the turbine assembly and two further rotors mounted one upstream and the other downstream of the first rotor and rotatable mechanically independently thereof, each of said two further rotors carrying a row of ducted fan rotor blades mounted on the tips of the turbine rotor blades.

According to a feature of the invention, the upstream and downstream turbine rotors may be designed for contra-rotation with respect to the first turbine rotor. According to further features, the upstream turbine rotor may be carried by a bearing upstream of the first turbine rotor and surrounding the shaft, and the downstream turbine rotor may be carried by an outboard bearing on the downstream side of the downstream rotor.

In one form of the invention there is a driving connection between the upstream and downstream turbine rotors. In another form the upstream and downstream rotors are rotatable mechanically independently of one another.

Two embodiments of the invention will now be described by way of example with reference to the accompanying drawings, of which:

Figure 1:
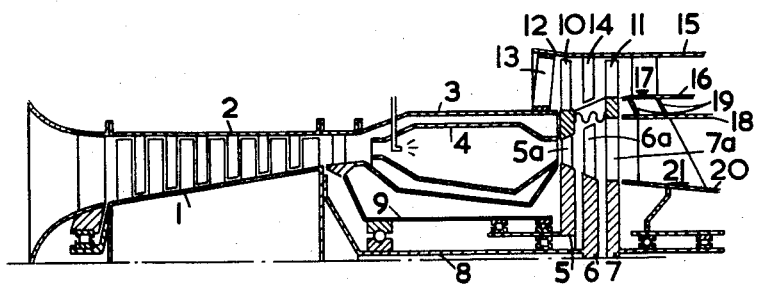
Figure 1 is a diagrammatic half-sectional view of a gas turbine jet propulsion plant of the ducted fan type.
Figure 2:
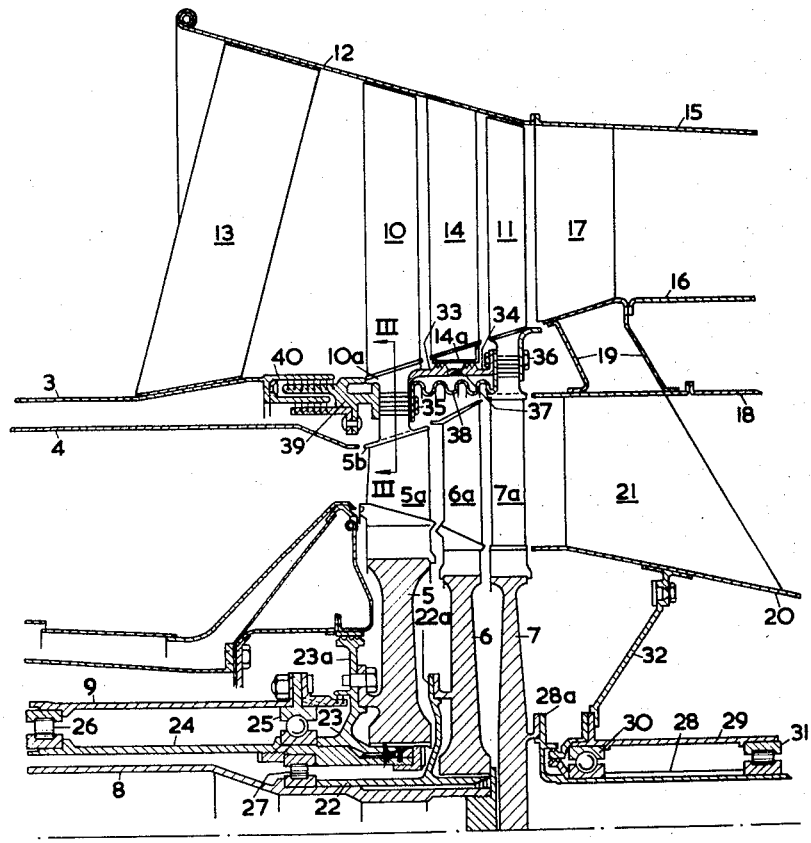
Figure 2 shows part of the plant of Figure 1 to an enlarged scale.

The plant shown in Figures 1 and 2 comprises a multistage axial flow compressor having a bladed rotor 1 and an enclosing bladed stator 2, a combustion system receiving air from the compressor and including an annular aircasing 3 enclosing an annular flame tube 4, and an axial flow turbine assembly receiving combustion gases from the combustion system and having three axially successive rotors 5, 6, 7 carrying rows of axial flow turbine rotor blades 5a, 6a, and 7a arranged in series flow relationship, the rotors 5, 7 being designed to contra-rotate with respect to rotor 6. The compressor 1 and the intermediate turbine rotor 6 are connected by a common driving shaft 8 which is enclosed by and supported in bearings within a tubular member 9 within the combustion system, this member constituting the backbone of the plant. The turbine rotors 5, 7 carry on the tips of their turbine rotor blades 5a, 7a rows of axial flow ducted fan rotor blades 10, 11 operating in series flow relationship in an annular ducted fan passage coaxially enclosing the turbine end of the plant and defined by a tubular outer wall 12 supported from the outer wall of the aircasing 3 by a row of struts 13 extending across the duct inlet. This outer wall also supports a row of axial flow ducted fan stator blades 14 lying between and co-operating with the rows of rotor blades 10, 11. The ducted fan discharges a propulsive jet stream of air through an annular exhaust duct defined by an outer wall 15 connected to the downstream end of wall 12 and an inner wall 16 supported from the outer wall by a number of struts 17 extending across and symmetrically disposed around the duct downstream of the ducted fan blades. The turbine discharges a propulsive jet stream of exhaust gases through a second annular exhaust duct defined by an outer wall 18 supported from the wall 16 by diaphragms 19 and an exhaust cone 20 supported from the outer wall 18 by a number of struts 21 extending across and symmetrically disposed around the duct.

Referring now to Figure 2, the driving shaft 8 extends beyond the rearward extremity of the backbone member 9 and has rigidly mounted on its rearward extremity a sleeve 22 having an external flange 22a to which is bolted or otherwise secured the turbine rotor 6 which accordingly drives the compressor rotor 1. Immediately upstream of this rotor 6 is the upstream turbine rotor 5 which has a central aperture through which the shaft 8 extends and is bolted or otherwise secured to an external flange 23a of a sleeve 23 rigidly mounted on the rearward end of a hollow auxiliary stub shaft 24 which encloses the driving shaft 8 and extends within the backbone 9 upstream from the rotor 5. The auxiliary shaft 24 is supported within the backbone 9 by a ball bearing 25 towards its downstream end and a roller bearing 26 at its upstream end, and is further supported on the driving shaft 8 by a roller bearing 27 lying radially within the ball bearing 25.

The downstream turbine rotor 7 is bolted or otherwise secured to an external flange 28a on a stub shaft 28 carried in an outboard bearing assembly on the downstream side of the rotor 7, this assembly consisting of a stationary sleeve 29, ball bearing 30 and roller bearing 31. The sleeve is supported from the turbine exhaust cone 20 by a diaphragm 32. The rotor 7 is thus supported from the outer stationary structure of the plant through the struts 13, 17, 21, and the walls 12, 15, 16, 18 independently of the support of rotors 5, 6.

The rows of turbine blades are in direct guide blade relationship with one another and no stationary turbine nozzle vanes or intermediate stator blades are provided, the flame tube 4 discharging directly into the turbine rotor blades 5a which contra-rotate with respect to and act as inlet guide vanes for the rotor blades 6a on the rotor 6. These blades 6a in turn act as inlet guide vanes for the blades 7a of the downstream rotor 7 which rotates in the same direction as rotor 5.

Figure 3:
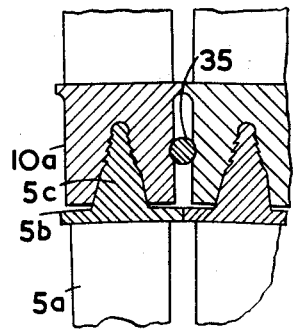
Figure 3 is a fragmentary transverse sectional view taken on the line III—III in Figure 2.

The blades 5a of the first rotor have tip shrouds 5b which, as shown in Figure 3, have external projections 5c of axially extending fir-tree root formation engaging in corresponding axially extending seatings in the roots 10a of the ducted fan rotor blades 10 whereby the latter are mounted on the tips of the turbine rotor blades 5a. The ducted fan rotor blades 11 are similarly mounted on the tips of the turbine rotor blades 7a. Angle rings 33, 34 attached by rows of bolts 35, 36 to the blade roots of the two rows of ducted fan rotor blades and to the tips of the turbine rotor blades 5a, 7a extend around the tips of the turbine rotor blades 6a and carry seals engaging with shrouds 14a at the inner ends of the ducted fan stator blades 14 to check leakage of working fluid from the turbine flow passage into the ducted fan flow passage. The ends of these rings 35, 36 are formed with circumferentially interengaging driving dogs 37 affording a driving connection whereby the two turbine rotors 5, 7 are constrained to rotate at the same speed. In addition the blade rows are connected by a flexible bellows 38 secured at its ends to the blade roots of the two rows of ducted fan rotor blades by the bolts 35, 36, the bellows also serving to prevent leakage from the turbine. In some cases, the rings 33, 34 may be omitted, and the bellows also serve to transmit the drive between the two rotors.

It will be noted that the driving dogs 37 and the bellows 38 both permit differential radial thermal expansion of the rotors 5, 7 and their rotor blades.

Also attached to the ducted fan rotor blade roots 10a by the bolts 35 are two rings 39 interdigitating and carrying seals engaging with corresponding rings 40 attached to the downstream end of the outer wall of the aircasing 3, the seals serving to prevent leakage of air from the aircasing into the ducted fan flow passage.

Figure 4:
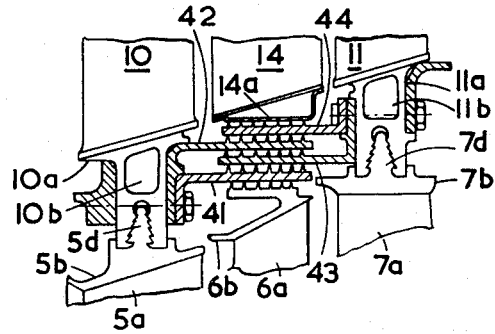
Figure 4 is a fragmentary axial sectional view of a modification of the plant shown in Figure 2.

In the modification shown in Figure 4, the turbine rotor blade tip shrouds 5b, 7b have projections 5d, 7d of circumferentially extending fir-tree formation engaging in corresponding circumferentially extending seatings in the ducted fan rotor blade roots 10a, 11a, the sides of which are formed with recesses 10b, 11b to reduce weight. The ducted fan rotor blade roots 10a have bolted to them the radially extending arms of a pair of angle rings 41, 42 the axially extending arms of which interdigitate with the corresponding arms of a pair of angle rings 43, 44 similarly bolted to the ducted fan rotor blade roots 11a. These rings all carry seals, those on the rings 41 and 42 engaging with the rings 43 and 44 respectively and those on ring 44 engaging with shrouds 14a at the tips ends of the ducted fan stator blades 14, while the tip shrouds 6b of the turbine blades 6a are provided with seals engaging with the ring 41. These seals serve to check leakage of working fluid from the turbine flow passage into the ducted fan flow passage and also around the tips of the turbine rotor blades 6a but there is no positive mechanical connection between the rotors 5, 7. Since for maximum efficiency of the ducted fan it is desirable that these rotors should rotate at approximately the same speed, the turbine blading is designed in accordance with known principles so that substantially equal amounts of work are done in the rows 5a, 7a. The rings 41, 42, 43 and 44 should be sufficiently flexible to allow for a limited amount of differential radial expansion of the rotors 5, 7.

I claim:

1. A gas turbine jet propulsion plant of the ducted fan type comprising a compressor including a bladed rotor; a turbine assembly coaxial with an axially spaced from the compressor, said turbine assembly including three axially successive turbine rotors, each including a row of axial flow turbine rotor blades mounted on its periphery, said blades being arranged for flow of working fluid therethrough in a direction away from the compressor; a shaft drivingly connecting said compressor rotor and the intermediate turbine rotor; a combustion system lying between said compressor and said turbine assembly and surrounding said shaft; a stationary tubular member within said combustion system and surrounding said shaft; an outer tubular wall partially defining an annular duct coaxially surrounding the turbine assembly; two rows of ducted fan rotor blades arranged in series flow relationship within said annular duct, one row being mounted on the tips of the turbine rotor blades of the upstream turbine rotor and the other row being mounted on the tips of the turbine rotor blades of the downstream turbine rotor; duct means defining paths for the discharge of air from the annular duct and exhaust gases from the turbine assembly; a bearing upstream of the intermediate turbine rotor, supported by said tubular member and surrounding said shaft, said upstream turbine rotor being carried by said bearing for rotation mechanically independently of said intermediate turbine rotor; an outboard bearing assembly on the downstream side of said downstream turbine rotor, said downstream turbine rotor being carried by said bearing assembly for rotation mechanically independently of said intermediate turbine rotor; and means extending across said air and exhaust gas paths and supporting said bearing assembly from said outer tubular wall.

2. Plant according to claim 1 wherein the upstream and downstream turbine rotors are designed for contra-rotation with respect to the intermediate turbine rotor.

3. Plant according to claim 2 wherein the rotor blades of the three turbine rotors are in direct guide blade relationship with one another.

4. Plant according to claim 1 further comprising means lying radially outwardly of the tips of the turbine rotor blades of said intermediate turbine rotor affording a driving connection between said upstream and downstream rotors, said driving connection means being such as permit differential radial expansion of the upstream and downstream turbine rotors.

5. Plant according to claim 4 wherein said driving connection means comprises a member secured to the roots of the ducted fan rotor blades on the upstream turbine rotor, a member secured to the roots of the ducted fan rotor blades on the downstream turbine rotor, and means forming a torque-transmitting interengagement between said members.

6. Plant according to claim 4 wherein said driving connection comprises a flexible bellows secured at its ends to the roots of the two rows of ducted fan rotor blades.

7. A gas turbine jet propulsion power plant of the ducted fan type comprising a compressor including a bladed rotor; a turbine assembly coaxial with and axially spaced from the compressor, said turbine assembly including three axially successive turbine rotors, each including a row of axial flow turbine rotor blades mounted on its periphery, said blade rows being arranged in direct guide blade relationship with one another for flow of working fluid therethrough in a direction away from the compressor, the blades of the upstream and downstream rows being designed for contra-rotation with respect to the blades of the intermediate row and so that substantially equal amounts of work are done in the upstream and downstream rows; a shaft drivingly connecting said compressor rotor and said intermediate turbine rotor; a combustion system lying between said compressor and said turbine assembly and surrounding said shaft; a stationary tubular member within said combustion system and surrounding said shaft; an outer tubular wall partially defining an annular duct coaxially surrounding the turbine assembly; two rows of ducted fan rotor blades arranged in series flow relationship within said annular duct, one row being mounted on the tips of the turbine rotor blades of the upstream turbine rotor and the other row being mounted on the tips of the turbine rotor blades of the downstream turbine rotor; means providing a running seal between the upstream and downstream turbine rotors around the tips of the turbine rotor blades of the intermediate turbine rotor; duct means defining paths for the discharge of air from the annular duct and exhaust gases from the turbine assembly; a bearing disposed upstream of the turbine rotor and supported by said tubular member and surrounding said shaft, said upstream turbine rotor being carried by said bearing for rotation mechanically independently of said intermediate and downstream turbine rotors; an outboard bearing assembly disposed on the downstream side of said downstream turbine rotor, said downstream turbine rotor being carried by said bearing assembly for rotation mechanically independently of said upstream and intermediate turbine rotors; and means extending across said air and exhaust gas paths and supporting said bearing assembly from said outer tubular wall.

References Cited in the file of this patent

UNITED STATES PATENTS

| | | |
|---|---|---|
| 2,430,399 | Heppner | Nov. 4, 1947 |
| 2,461,242 | Soderberg | Feb. 8, 1949 |
| 2,505,660 | Baumann | Apr. 25, 1950 |
| 2,548,975 | Hawthorne | Apr. 17, 1951 |
| 2,611,532 | Ljungstrom | Sept. 23, 1952 |
| 2,614,385 | Feilden | Oct. 21, 1952 |
| 2,692,724 | McLeod | Oct. 26, 1954 |
| 2,711,631 | Willgoos | June 28, 1955 |

FOREIGN PATENTS

| | | |
|---|---|---|
| 809,864 | Germany | Aug. 2, 1951 |